United States Patent [19]
Dijkstra et al.

[11] Patent Number: 5,636,268
[45] Date of Patent: Jun. 3, 1997

[54] COMMUNICATION SYSTEM WITH QUEUES

[75] Inventors: Lolke Dijkstra, Leidschendam; Richard A. Sturrus, Gouda, both of Netherlands

[73] Assignee: Koninklijke PTT Nederland N.V., Groningen, Netherlands

[21] Appl. No.: 504,529

[22] Filed: Jul. 20, 1995

[30] Foreign Application Priority Data

Jul. 29, 1994 [NL] Netherlands ............................ 9401245

[51] Int. Cl.$^6$ ............................ H04M 3/00; H04M 7/00
[52] U.S. Cl. ............................ 379/207; 379/220; 379/265; 379/266
[58] Field of Search ............................ 379/221, 222, 379/207, 220, 309, 265, 266, 210

[56] References Cited

U.S. PATENT DOCUMENTS

| | | | |
|---|---|---|---|
| 4,400,587 | 8/1983 | Taylor | 379/266 |
| 4,862,496 | 8/1989 | Kelly | 379/221 |
| 4,885,780 | 12/1989 | Gopal et al. | 379/221 |
| 4,953,204 | 8/1990 | Cuschleg, Jr. et al. | 379/266 |
| 5,291,551 | 3/1994 | Conn | 379/265 |
| 5,291,552 | 3/1994 | Kerrigan | 379/220 |
| 5,299,259 | 3/1994 | Otto | 379/221 |
| 5,299,260 | 3/1994 | Shaio | 379/265 |
| 5,309,505 | 5/1994 | Szlam | 379/265 |
| 5,309,513 | 5/1994 | Rose | 379/266 |
| 5,311,585 | 5/1994 | Armstrong | 379/221 |
| 5,406,620 | 4/1995 | Pei | 379/220 |
| 5,459,780 | 10/1995 | Sand | 379/265 |

FOREIGN PATENT DOCUMENTS

| | | |
|---|---|---|
| 0424015 | 4/1991 | European Pat. Off. |
| 0421583 | 4/1991 | European Pat. Off. |
| 9201350 | 1/1992 | WIPO |

OTHER PUBLICATIONS

R.S. Bell et al.,"Business Networks–PBX and Central Office Based", Session 23A, Paper 3, *Telecommunications Switching–state of the art impact on networks and services, Proceedings of the International Switching Symposium,* Florence, Italy, May/7–11, 1984, pp. 1–8, title sheet.

G.W. Gawrys et al., "ISDN: Integrated Network/Premises Solutions for Customer Needs", *IEEE International Conference on Communications* '86. Toronto, Canada, Jun. 22–25, 1986, title sheet and pp. 1.1.1–1.1.5.

D.E. Harvey et al., "Call Center Solutions", *AT&T Technical Journal,* Sep./Oct. 1991, vol. 70, No. 5, pp. 36–44.

*Primary Examiner*—Krista M. Zele
*Assistant Examiner*—Thomas F. Presson
*Attorney, Agent, or Firm*—Michaelson & Wallace; Peter L. Michaelson; John C. Pokotylo

[57] ABSTRACT

The invention relates to a communication system comprising a first network, a second network, first stations coupled to the first network and second stations coupled to the second network, with the first network and the second network being mutually coupled. The system comprises queuing means for recognizing calls for a group of second stations and for placing said calls in a queue, and control means for assigning to calls in a queue a connection to a second station. In accordance with the invention in such a communication system the queuing means are coupled to the first network, so that the queuing means are not formed in the second network. The first and the second network can be national telephone networks of different countries.

24 Claims, 2 Drawing Sheets

COMMUNICATION SYSTEM WITH QUEUES

BACKGROUND OF THE INVENTION

The invention relates to a communication system, comprising a first network, a second network, first stations coupled to the first network and second stations coupled to the second network, with the first network and the second network being mutually coupled, with the system comprising queuing means for recognizing calls for a group of second stations and placing said calls in a queue, and with the system comprising control means for assigning to calls in a queue a connection to a second station. Such a communication system is known in practice.

With communication systems of the above-mentioned kind, first stations such as subscriber stations can generate calls for establishing connections to second stations, with the second stations possibly also being subscriber stations. In known systems, such calls are always accepted as much as possible, that is to say, a connection to a second station is established as far as possible therefore, from a first station, via the first network and the second network, to a second station. If it appears that, while trying to establish the connection, the second station cannot be reached, for example, because the link between the second network and the second station concerned is engaged, the connection cannot be completed. In known systems, the call is then installed in a queue until the second station concerned becomes available and the connection can be completed. Since the connection in the above example has been established as far as possible in the second network, the call concerned will be installed in a queue in the second network. This has the disadvantage that a connection between the first and the second network is kept engaged in this manner, whereas said connection is not (yet) used in effect. Moreover, both in the first and in the second network, switching means are kept engaged unnecessarily. Furthermore, in known systems this incurs relatively high cost for the users, since the cost of the connection already established as far as possible in the second network will be accounted to the users of the first stations (subscribers).

The above situation, for example, is disadvantageous if the first network is the national (telephone) network of a first country and the second network is the national network of another country, while the first stations are subscriber stations and the second stations are agents for information and entertainment purposes. If all the agents available are, at a given moment, engaged, the subscribers concerned incur a relatively high cost for waiting for a connection to such a foreign agent. However, in case of domestic connections with the first network and the second network belonging to different districts or different telephone companies, the above-mentioned situation would also lead to unwanted cost.

SUMMARY OF THE INVENTION

An object of the invention is to eliminate above-mentioned and other disadvantages of the prior art and to provide a communication system which is capable of establishing connections between first and second networks only when the connection requested can be established completely. An additional object of the invention is to provide a communication system which has a simple structure and makes low demands, especially on the second network. A further object of the invention is providing a communication system, which minimizes the cost of establishing a connection.

The communication system in accordance with the invention to this end is characterized in that the queuing means have been coupled to the first network. As a consequence, it is possible that the queue is already formed at the level of the first network, hence without a connection being established to the second network. The queuing means can in this context be situated in the first network, but can also be arranged outside the first network. Preferably, however, the queuing means are situated in a switching station of the first network.

As the queuing means in accordance with the invention are coupled to the first network, it is therefore possible to place calls for (a group of) second stations in a queue of the first network without first establishing a further connection. If a required second station is available, the further connection can immediately be established. If, however, the second station is not available the call will wait in the queue concerned of the first network until the second station becomes available. The connection established during the waiting period is therefore relatively short and therefore inexpensive.

Preferably the control means are only coupled to the first network. Worded differently, a communication connection is present between the control means and the queuing means of the first network for transmitting control information, but such a coupling is not present or need not be present between the control means and the second network. This enables situating the control means in or at the first network, so that the second network can be relatively simple. The control means therefore preferably have been arranged for monitoring the availability of the second stations on the basis of data which are present in the queuing means coupled to the first network. In this manner, the control means can determine to which second station the next connection has to be established.

It is possible to implement the communication system in accordance with the invention such that it comprises various first networks and at least one second network, with each first network being coupled to at least one second network. In this context, at least two first networks can comprise joint control means. As a consequence, the communication system can be implemented in a simpler manner.

Advantageously, the communication system in accordance with the invention is arranged for forming a separate queue for each group of second stations. This has the advantage of a simpler administration of the queues. The different queues can be situated in a single assembly of queuing means (queue unit).

Although the first and the second network can in principle be separate networks, the first network and the second network can form sub-networks of a third network. In this context the first and second network can be interpreted as parts of a larger network.

A communication system in accordance with the invention can be implemented in such manner that the first network comprises various switching stations, and that the queuing means are coupled to the respective switching stations which are coupled to a subscriber station in a direct manner, that is to say without intermediary of a further switching station.

The invention is based on the insight that forming a queue does not have to take place in the vicinity of the second stations. By forming the queue (or queues) in the vicinity of the first stations, not only the advantage is attained that a much shorter connection is formed between the first station and the queue, but also that a functionality is not needed in the second network, that is to say that queuing means need not be present in the second network. Worded differently, the invention not only minimizes the distance between the first station and the queue, but also enables simplification of the second network. The latter is especially advantageous if the second network has insufficient means to form queues, as can for example be the case in national telephone networks of some countries, but also in company networks with a limited capacity.

The invention, inter alia, finds special use for information numbers of telephone networks. In this context, in accordance with the invention it is possible to have waiting taking place against a (relatively) low tariff, whereas a higher tariff is charged only after connecting-through. Such an arrangement can both be advantageous for telephone companies and for subscribers.

REFERENCES

[1] EP 0 424 015 & U.S. Pat. No. 4,953,204 (Cuschleg et al.)
[2] EP 0 421 583
[3] Gawrys et al.: "ISDN: Integrated Network/Premises solutions", IEEE International Conference on Communications, Toronto 1986.

BRIEF DESCRIPTION OF THE DRAWINGS

The invention will now be described in further detail with reference to the drawings, in which.

DETAILED DESCRIPTION OF PREFERRED EMBODIMENTS

Figure 1:
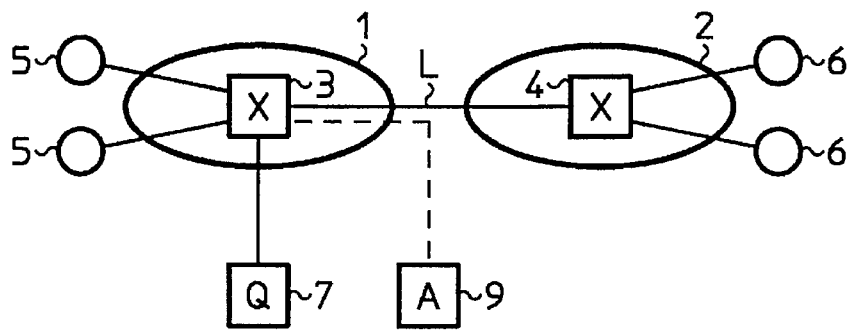
FIG. 1 diagrammatically shows a first communication system, having a first and second network, in accordance with the invention.

The communication system in accordance with the invention, diagrammatically shown in FIG. 1, comprises a first network 1 and a second network 2, coupled by a link L. The first and second network may be telephone networks, data networks or communication networks in general. In the following, by way of example, it will be assumed that the networks 1 and 2 are public telephone networks which are also suited for data transport.

The first network 1 and the second network 2, respectively, are provided with a switching station 3 and a switching station 4, which may be (telephone) exchanges (X). First stations (for example subscriber stations) 5 are coupled to the switching station 3; whereas second stations (for example agent stations) 6 are coupled to the switching station 4. The system is arranged for establishing a communication connection between a first station 5 and a second station 6. The networks 1 and 2, may of course comprise various switching stations.

In accordance with the invention a queue unit 7, which forms the queuing means, is coupled to the first network 1, as shown in FIG. 1. In the case represented, the queue unit 7, which is arranged for forming a queue (Q) of calls not yet connected-through, is situated outside the network 1 and is coupled directly to the switching station 3. In this context, the queue unit 7 can be situated in an adjacent network. A control unit 9, which, inter alia, is arranged for controlling a queue (Q) and a suitable administration (A) of the means available, is also situated outside the network 1 and is directly coupled to the switching station 3 (in the FIGS., control links are shown with broken lines). Calls of the first stations 5 for establishing connections to second stations 6 are in accordance with the invention placed in a queue (Q) of the queue unit 7. Subsequently, it is verified whether the connection required can be established. If this is possible, the connection is immediately established and the waiting time in the queue (Q) concerned will be very short. If establishing a connection is not possible, the call will remain in the queue until the connection can be established.

The coordination between the switching station 3, which in the case shown establishes the connections to the second network 2, and the queue 7, in which the queue (Q) of calls is placed, is provided by the control unit 9. In this context, the control unit 9 has to have appropriate information at its disposal, for example a list of all participating second stations, the calls in the queue or queues, the connections already established, and second stations which have become available. This information can be transmitted from the queue unit 7, or form the switching station 3 coupled thereto, to the control unit 9. Part of this information, such as the number of participating second stations, can be predetermined information which has been entered into the control unit directly or via the switching station 3. Other information, such as information relating to second stations (agents) becoming available, can be determined dynamically, e.g. by determining for each connection established which first station is connected to which second station, and which second stations terminate their calls with the respective first stations.

An additional queue unit can optionally be present in the communication system, which unit may coupled to (switching station 4 of) the second network 2. In this context, said additional queuing means can serve as an addition to the queue unit 7, for example, for intercepting calls in case a second station is unexpectedly not available. It will be clear form the above that, in accordance with the prior art, when establishing a connection from a first station 5 to a second station 6 only said additional queue unit coupled to the second network 2 is used, whereas in accordance with the invention also, and if possible only, queue unit 7 is applied.

The control unit 9 is arranged for controlling the (process of) connecting-through (waiting calls). In this context, as indicated above, a coupling is present between the queue and the control unit in order to transmit appropriate control information. Preferably, the control unit 9 monitors the connections between first stations and second stations to determine which second stations are available. The ending of a call by a first station implies that a second station has become available.

The number of second stations, such as the number of agents for a certain service, forms predetermined information which is stored in the control unit 9 permanently or semi-permanently. The further control information, such as second stations becoming engaged and available, is monitored dynamically by the control unit 9, inter alia, on the basis of the status of the queue unit or queue units, and the status of the calls already connected through. If a second station would drop out, that is to say, would become unusable or unattainable, this can simply be deduced from the number of unsuccessful calls. In this context, the switching station 3 can detect the repeated failure of calls and report this to the control unit 9.

Figure 2:
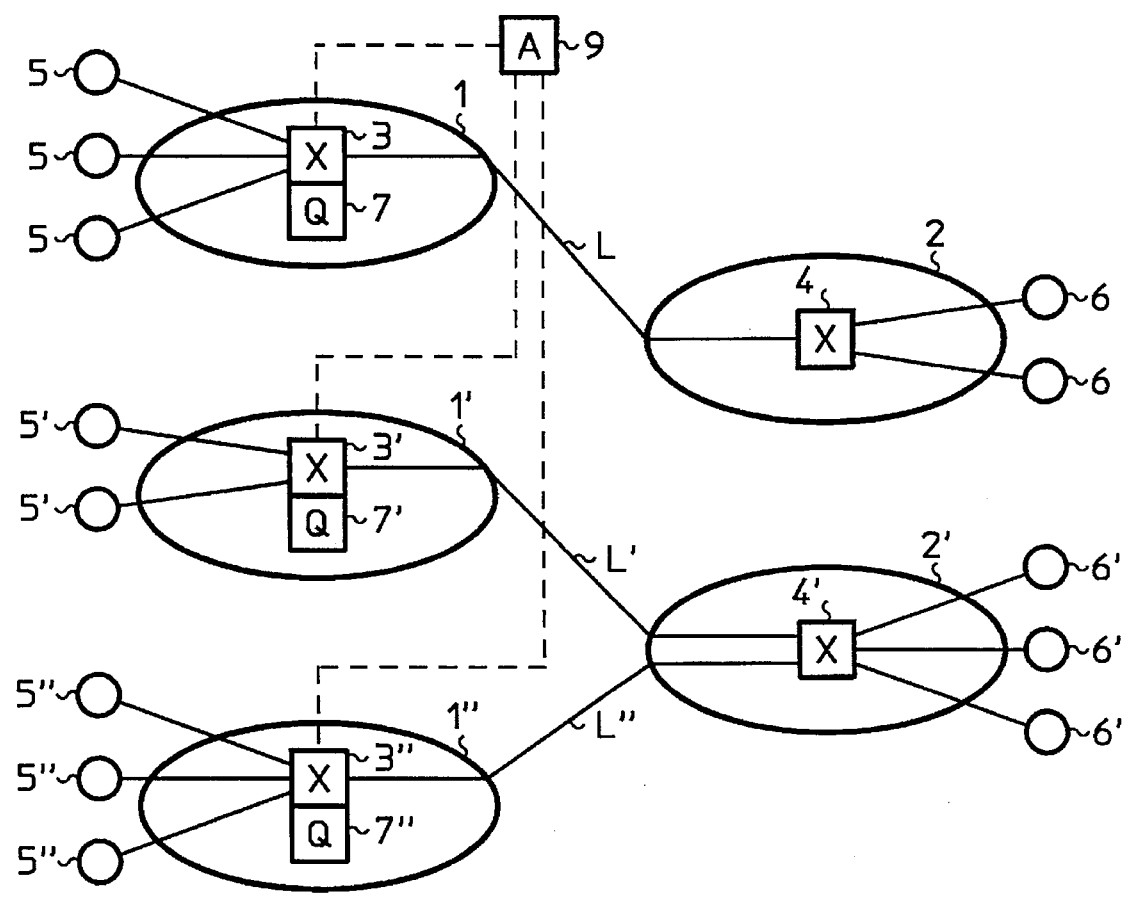
FIG. 2 diagrammatically shows a second communication system, having a plurality of first and second networks, in accordance with the invention.

The communication system, diagrammatically represented in FIG. 2, in accordance with the invention comprises three first networks 1, 1', 1", respectively, and two second networks 2, 2', respectively. In the case shown, the two networks 1', 1" are coupled to one second network (2') via the links L' and L", respectively; whereas the other first network (1) is only coupled to the second network 2 via the link L. Connections can be established via the links L, L', L", respectively, which represent the couplings between various networks. The links L, L', L", in the first place, represent couplings between networks over which, for the benefit of the elucidation of the invention, relevant connections can be formed. Between various networks, possibly further couplings can be present; these are not shown.

As well as in the system of FIG. 1, in each first network 1 (1', 1" respectively) a switching station 3 (3', 3" respectively) is represented, and in each second network 2 (2' respectively) a switching station 4 (4' respectively). First stations 5, 5', 5" are coupled to the switching stations 3, 3', 3", respectively; whereas second stations 6 and 6' are coupled to the switching stations 4 and 4', respectively. Of course, the first and second networks each can be provided with various switching stations, which for simplicity reasons are not shown here.

The system of FIG. 2 further comprises a control unit 9, which is coupled to the first networks 1, 1', 1". The first three networks 1, 1' and 1", in the case represented, comprise one joint control unit 9. In this case the control unit 9 not only determines which second station is available, but also indicates which of the first networks said available second station has to be assigned to, for example if calls are being conducted from the networks 1' and 1" to a second station 6'. Information relating to, inter alia, the occupation of the second stations and the number of calls in the queues (Q) is fed from the switching stations 3, 3' and 3" to the control unit, which keeps an administration (A) thereof and on the basis thereof feeds control information, such as assignments of second stations to waiting calls, to the switching stations and the queue units coupled thereto.

Figure 3:
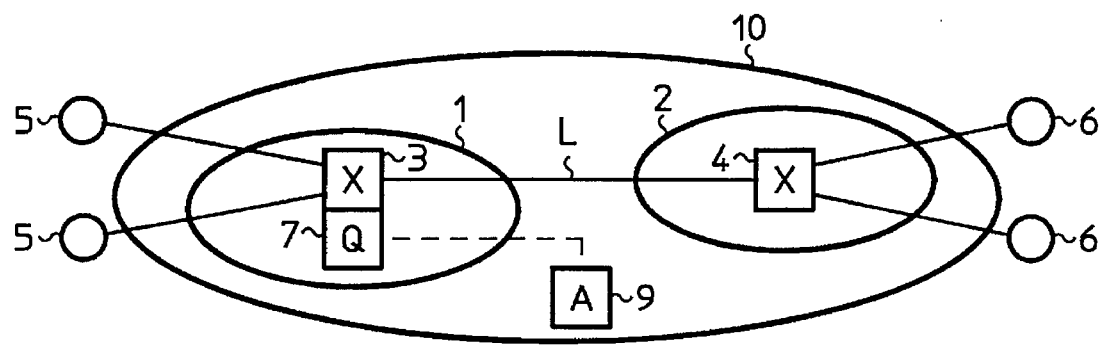
FIG. 3 diagrammatically shows a third communication system, having first and second sub-networks of a network, in accordance with the invention.

The communication system, diagrammatically represented in FIG. 3, in accordance with the invention comprises a first network 1 and a second network 2, which form part of a larger sub-network 10 and in this manner form sub-networks of the network 10. In this case also, the first (sub)-network 1 comprises a switching station 3 and a queue unit 7 coupled thereto, and first stations 5 are coupled to the switching station 3. The second (sub)-network 2 comprises a switching station 4, to which second stations 6 are coupled. The first (sub)-network 1 and the second (sub)-network 2 are mutually coupled by a link L.

A control unit 9 is coupled to the queue unit 7, which control unit carries out the control tasks described earlier. In the case shown, the control unit 9 is directly coupled to the queue unit 7, and information is exchanged from and to the switching station 3 via the queue unit 7. It will be clear that a direct coupling can be provided, also or as an alternative, between the control unit 9 and the switching station 3. Between the switching station 3 and the queue unit 7 integrated therewith, an internal coupling can be present (not shown).

It will be clear from FIG. 3 that the queue unit 7, with the queue Q, in network 10 are relatively close to the first stations 5.

Figure 4:
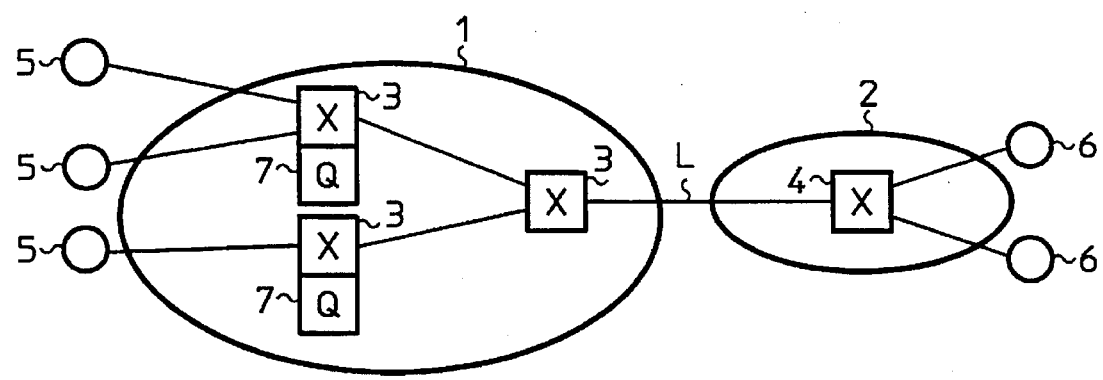
FIG. 4 diagrammatically shows a fourth communication system, having a first network with multiple switching stations, and a second network, in accordance with the invention.

The communication system according to the invention and diagrammatically represented in FIG. 4, also comprises a first network 1 and a second network 2. The network 1 of FIG. 4 in this context comprises various switching stations 3, which are each coupled to one or more first stations 5. In accordance with the invention, in this context, a queue is formed in the queue unit (queuing means) which is situated closest to the station 5 concerned, that is to say, possesses the shortest distance to the first stations 5. In this case, in one (first) network therefore several queues (Q) are present at those switching stations 3, which are directly coupled to the first stations 5. Each queue (Q) in the case shown therefore is available to some of the first stations 5.

For simplicity reasons, in FIG. 4, no control unit is shown. It will be clear that a control unit may be present in the system of FIG. 4, and preferably can be coupled to both queue units, possibly via the respective switching stations. It is also possible to include a control unit in one or in both queue units. In this context, such an integrated control unit can also be coupled to another queue unit in order to provide the control thereof.

As can be seen in FIG. 4, the invention always attempts to minimize the cost of the connection established. In general, it may be said that the object of the invention is to minimize a cost function of the connection between a first station (subscriber station) and the relevant queue, also in the cases of FIGS. 1, 2, and 3. In this context, the term "cost" can be interpreted broadly, and can not only be expressed in money (connecting cost) but also in a distance (between the first station and queue) or the number of intermediary switching stations, possibly combined with the (estimated) waiting time in the queue.

A switching station for use in a system in accordance with the invention is advantageously provided with means for recognizing calls which are directed to one or more specific groups of second stations. In this context, the switching station can be provided with a list of (access) numbers which must be placed in a queue, and the switching station can comprise comparison means for comparing (numbers of) incoming calls with (numbers of) the list mentioned. Such a list can also comprise a joint number of a group of second stations (for example agents). A switching station can also be provided with queuing means for forming a queue of calls for at least a group of second stations. Such a switching station furthermore is provided with input and output means for exchanging information with the control means and the queuing means.

The examples of the FIGS. 1 to 4 can of course also be combined to communication systems in which the invention can also be used. Thus the combination of the examples of the FIGS. 3 and 4 produces a communication system, in which various switching stations exist in a (first) sub-network, and with the queues in said sub-network being formed close to the first stations.

It will be understood by those skilled in the art that the invention is not restricted to the exemplary embodiments shown, and that various alterations and additions are possible without departing from the scope of the invention.

We claim:

1. A communication system comprising;
   a) a first network;
   b) a second network;
   c) first stations coupled to said first network;
   d) second stations coupled to said second network, wherein said first network and said second network are mutually coupled;

e) queuing means for recognizing calls from one of the first stations to a group of second stations and placing said calls in a queue, said queuing means being coupled to said first network; and f) control means for assigning a connection to a second station to calls in the queue.

2. A communication system in accordance with claim 1 wherein said queuing means is situated in a switching station of said first network.

3. A communication system in accordance with claim 1 wherein said control means is only coupled to said first network.

4. A communication system in accordance with claim 1 wherein said control means is situated in said first network.

5. The communication system of claim 1 wherein the first network is located in a first district and the second network is located in a second district.

6. The communication system of claim 1 wherein the first network belongs to a first telephone company and the second network belongs to a second telephone company.

7. A communication system in accordance with claim 1 wherein the second stations define a number of groups of second stations, each group having a separate queue.

8. A communication system in accordance with claim 1 wherein said first stations are subscriber stations and said second stations are agent stations.

9. A communication system in accordance with claim 1 wherein said first network and said second network form sub-networks of a third network.

10. A communication system in accordance with claim 1 wherein said first network includes a plurality of switching stations, and wherein said queuing means is coupled to the respective switching stations which are directly coupled to a subscriber station.

11. In a communication system comprising a first network, a second network, first stations being coupled to said first network, second stations being coupled to said second network wherein said first network and said second network are mutually coupled, queuing means for recognizing calls from one of the first stations to a group of second stations and placing said calls in a queue, and control means for assigning a connection to a second station to calls in the queue, wherein said queuing means is coupled to said first network, a switching station provided with means for recognizing calls destined for one or more specified groups of second stations.

12. A switching station in accordance with claim 11, further comprising second queuing means for forming a queue of calls for at least one group of second stations.

13. The communication system of claim 11 wherein the first network is located in a first district and the second network is located in a second district.

14. The communication system of claim 11 wherein the first network belongs to a first telephone company and the second network belongs to a second telephone company.

15. A communication system comprising:

a) a plurality of first networks;

b) at least one second network;

c) first stations coupled to said plurality of first networks;

d) second stations coupled to said at least one second network;

e) queuing means for recognizing calls from one of the first stations to a group of the second stations and placing said calls in a queue means being coupled to said first network; and f) control means for assigning a connection to a second station to calls in the queuing means.

16. The communication system of claim 15 wherein at least two of the plurality of first networks comprise a joint control means.

17. The communication system of claim 15 wherein the second stations define a number of groups of second stations, each group having a separate queue.

18. The communication system of claim 15 wherein said first stations are subscriber stations and said second stations are agent stations.

19. The communication system of claim 15 wherein said first network and said second network form sub-networks of a third network.

20. The communication system of claim 15 wherein said first network includes a plurality of switching stations, and wherein said queuing means is coupled to the respective switching stations which are directly coupled to a subscriber station.

21. The communication system of claim 15 wherein the first network is located in a first district and the second network is located in a second district.

22. The communication system of claim 15 wherein the first network belongs to a first telephone company and the second network belongs to a second telephone company.

23. A communication system comprising:

a) a first network;

b) a second network;

c) first stations coupled with the first network;

d) second stations coupled with the second network, wherein the first network and the second network are mutually coupled;

e) queuing means for recognizing calls from one of the first stations to a group of the second stations and for placing the calls in a queue, the queuing means being coupled with the first network; and f) control means for assigning a connection to a second station to calls in the queue, wherein the control means are coupled with the first network and wherein the control means have been arranged for monitoring the availability of the second stations based only on data, which are present in the queuing means coupled with the first network.

24. A communication system comprising:

a) a first network of a first network operator;

b) a second network of a second network operator;

c) first stations coupled with the first network;

d) second stations coupled with the second network, wherein the first network and the second network are mutually coupled;

e) queuing means for recognizing calls from one of the first stations to a group of second stations and placing the calls in a queue, the queuing means being coupled with the first network; and f) control means for assigning a connection to a second station to calls in the queue.

\* \* \* \* \*